(No Model.)
4 Sheets—Sheet 1.
F. EGGERS.
BICYCLE LOCKING STAND.
No. 598,175.
Patented Feb. 1, 1898.
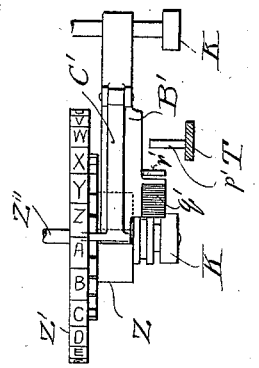
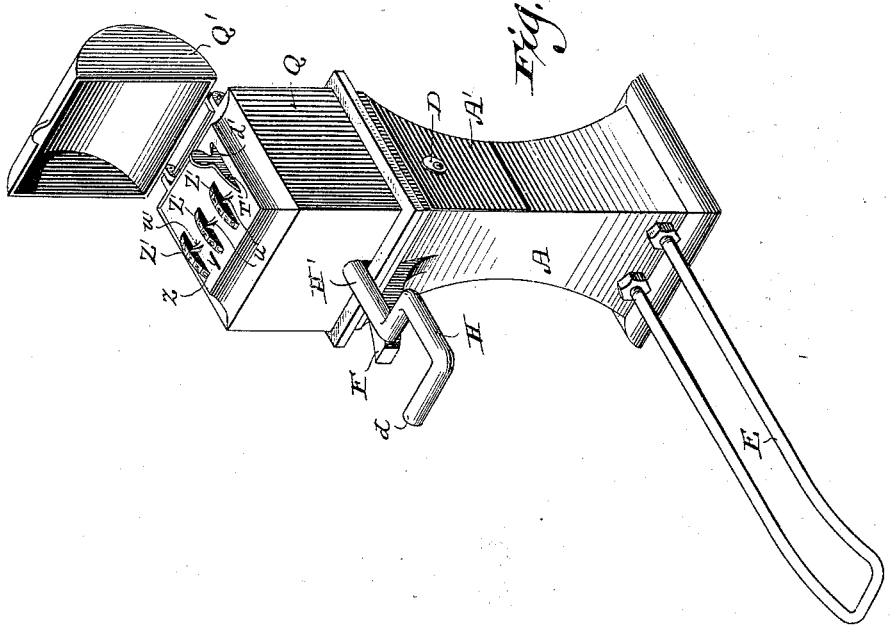
Witnesses.
Geo. W. Young.
N. E. Oliphant.
Inventor
Frank Eggers
By H. G. Underwood
Attorney
THE NORRIS PETERS CO., PHOTO-LITHO., WASHINGTON, D. C.

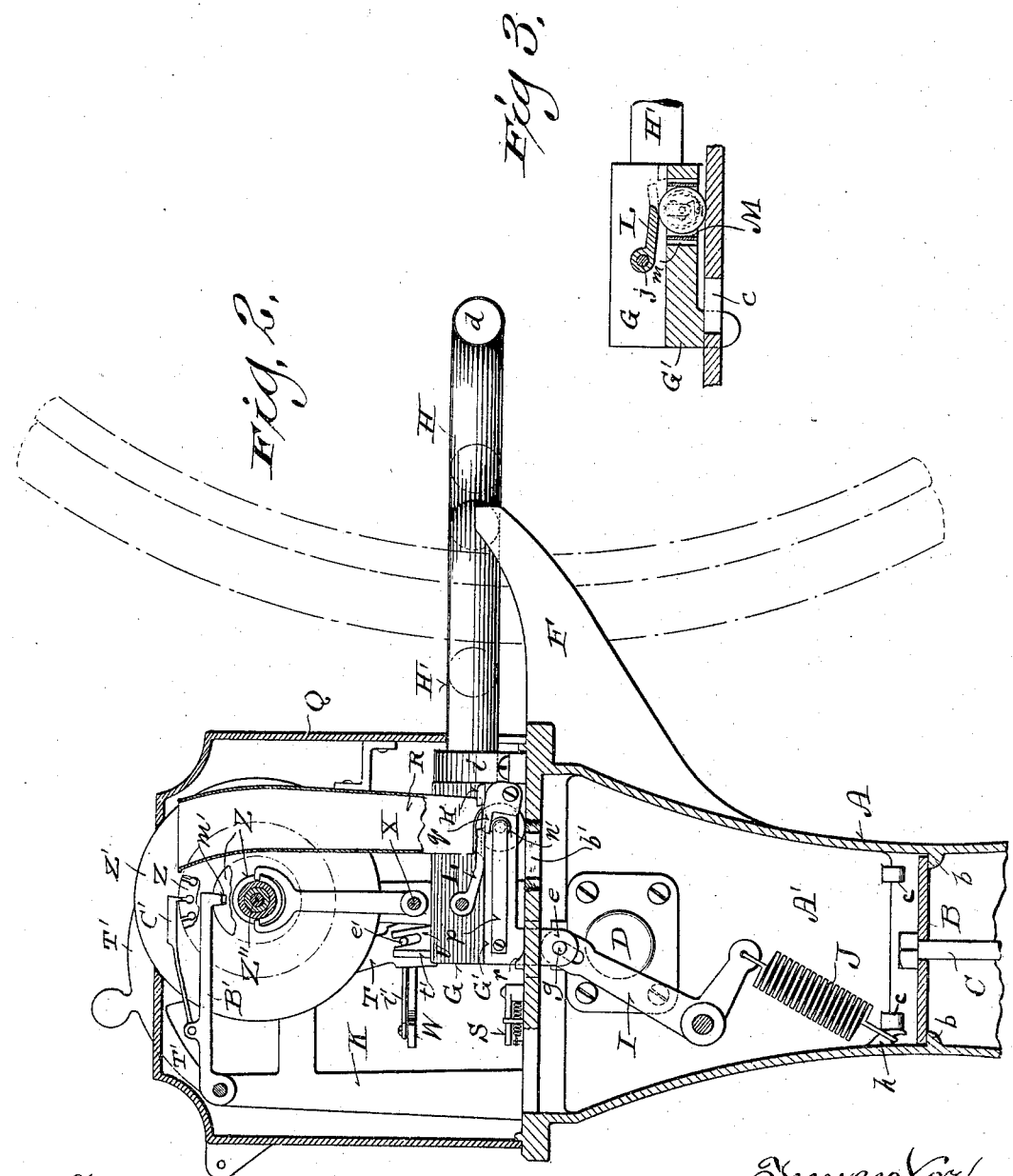

(No Model.)   4 Sheets—Sheet 3.

F. EGGERS.
BICYCLE LOCKING STAND.

No. 598,175.   Patented Feb. 1, 1898.

Witnesses:
Geo. W. Young.
N. E. Oliphant.

Inventor
Frank Eggers
By H. G. Underwood
Attorney (No Model.) 4 Sheets—Sheet 4.

F. EGGERS.
BICYCLE LOCKING STAND.

No. 598,175. Patented Feb. 1, 1898.

Witnesses:
Geo. W. Young,
N. E. Oliphant

Inventor
Frank Eggers.
By H. G. Underwood
Attorneys

UNITED STATES PATENT OFFICE.

FRANK EGGERS, OF TWO RIVERS, WISCONSIN.

BICYCLE-LOCKING STAND.

SPECIFICATION forming part of Letters Patent No. 598,175, dated February 1, 1898.

Application filed August 4, 1897. Serial No. 647,113. (No model.)

*To all whom it may concern:*

Be it known that I, FRANK EGGERS, a citizen of the United States, and a resident of Two Rivers, in the county of Manitowoc and State of Wisconsin, have invented certain new and useful Improvements in Bicycle-Locking Stands; and I do hereby declare that the following is a full, clear, and exact description thereof.

My invention contemplates a bicycle-stand having a permutation-lock that can be operated to secure a bicycle after a coin of predetermined value has been deposited in the stand.

The invention also contemplates provision for individual choice in the matter of setting movable parts of the lock, so as to determine the subsequent arrangement of its tumblers necessary to the release of the bicycle.

The invention further contemplates mechanism organized to prevent mischievous or evil-disposed persons from bringing about a release arrangement of the lock-tumblers; and said invention still further contemplates a provision against washers being made effective in the place of coins.

In view of the foregoing the aforesaid invention consists in certain peculiarities of construction and combination of parts hereinafter set forth, with reference to the accompanying drawings, and subsequently claimed.

Figure 5:
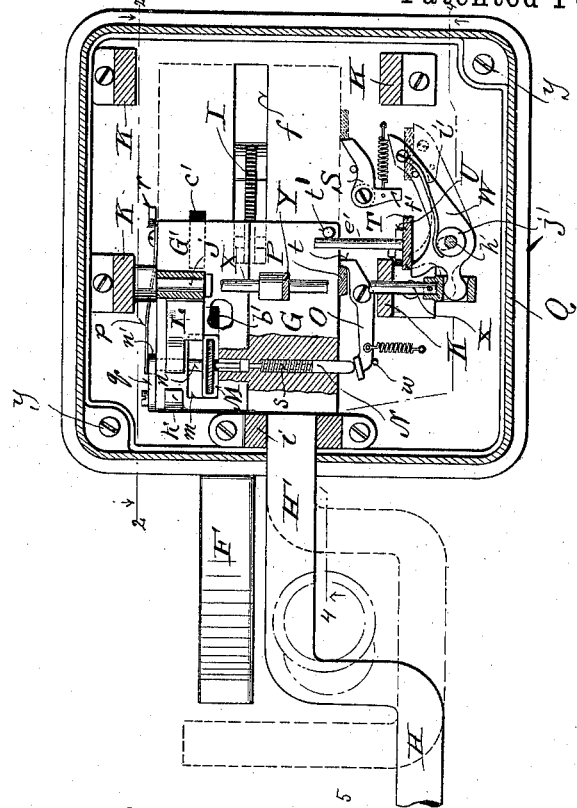
Figure 4:
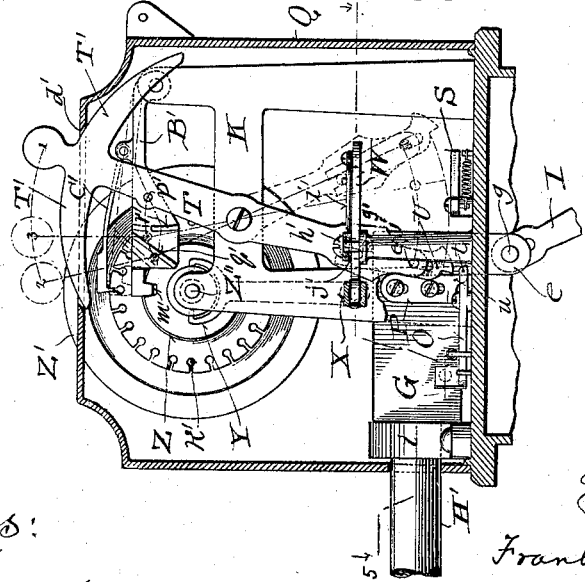
Figure 7:
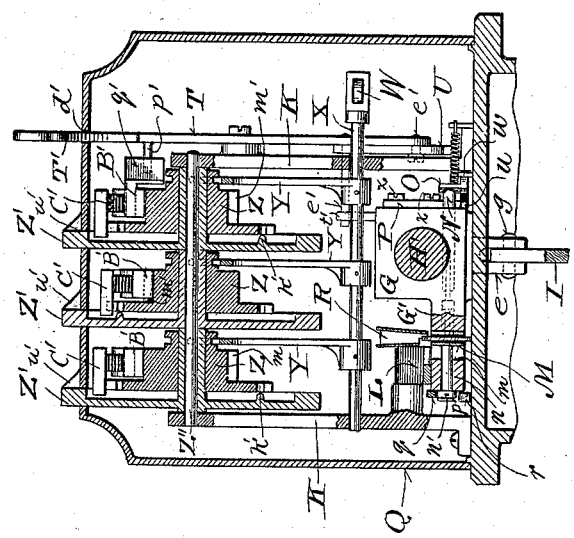
Figure 6:
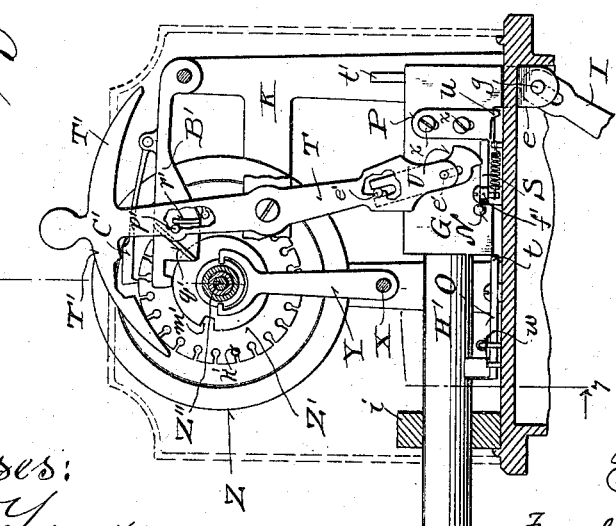

Figure 1 represents a perspective view of a bicycle-stand embodying my improvements; Fig. 2, a vertical sectional view of the structure partly indicated by line 2 2 in the fifth figure, certain of the parts being broken back for convenience of illustration; Fig. 3, a detail sectional view illustrating a portion of a sliding bolt, a latch for the same, and a coin-holder laterally reciprocative in a block attached to the bolt, the latch being lifted by a coin caught for a time in said holder; Fig. 4, a partly vertical sectional view indicated by irregular line 4 4 in the succeeding figure; Fig. 5, a plan view, partly in horizontal section, indicated by irregular line 5 5 in the preceding figure; Fig. 6, a vertical sectional view wherein most of the parts appear in side elevation, some of them being broken for convenience of illustration; Fig. 7, a vertical sectional view indicated by irregular line 7 7 in the preceding figure, and Fig. 8 a detail plan view illustrating a portion of the permutation-lock that constitutes part of my invention.

Referring by letter to the drawings, A represents a hollow cast-metal standard having a flat top, the general design of the standard being a matter of choice. Supported on ledges *b* within the standard, at a suitable elevation, is a horizontal plate B, and by means of a stay-bolt C, run through the plate to have its head come to rest thereon central of the same, the standard may be secured to a sidewalk or other convenient surface. That portion of the standard intermediate of its top and the plate aforesaid constitutes a chamber, to which access is had by the removal of a panel A', constituting part of said standard. The panel is herein shown as having offset bottom lugs *c*, that hook over an edge of the chamber-opening in the panel, and a lock D of any suitable construction is shown connected to said panel to have its bolt shoot back of another edge of said chamber-opening, this construction and arrangement of parts being clearly illustrated in Fig. 2.

Connected in any suitable manner to the lower front portion of standard A is a yoke E, provided for the engagement of the front or steering wheel of a bicycle, and an arm F, integral with said standard, projects from the upper portion of the same, on the yoke side thereof, this construction and arrangement of parts being clearly illustrated in Fig. 1.

Loose on the standard-top is a metal block G, having a lateral wing G', and in rigid connection with the block is the shank H' of a hook-bolt H, designed for engagement with the tire and rim portion of a bicycle-wheel positioned in yoke E, retraction of the bolt serving to bring the hook extremity *d* thereof in proximity to the standard-arm F, as shown by dotted lines in Figs. 2 and 5, it being understood that said bicycle-wheel comes to one side of said arm, owing to the set of said yoke, there being sufficient room in the bolt-hook to permit easy engagement therewith of the aforesaid bicycle-wheel. A lug *e* on the wing portion G' of block G depends through a slot *f* in the top of standard A, and a bell-crank lever I, fulcrumed in the chamber portion of said standard, has one of its arms provided with a longitudinal slot engaging a pin $g$, carried by the lug, the other arm of the lever being connected to a spiral spring J, that is hooked to a lug $h$ upon the interior of said standard, as clearly illustrated in Fig. 2, it being obvious that the spring operates by contraction to effect automatic forward movement of said block and hook-bolt in connection therewith upon release of a latch hereinafter particularly described.

The shank H' of the hook-bolt H is guided in a block $i$, made fast to the top of the standard, and a frame K, also made fast to the standard-top, is provided with a pivot $j$ for a gravity-latch L, that normally comes in the path of a lug $k$ on the wing G' of block G after the hook-bolt and parts in connection therewith have been shot forward, as clearly illustrated in Figs. 2 and 5.

An aperture $m$ in the forward portion of the block-wing G' contains a split metal band M, and the width of the aperture is about twice that of the split band therein. A stem $n$, extending from the middle of the split band, has loose play in the block-wing transversely of the latter, and the stem-head $n'$ abuts a flat spring $p$, made fast at one end to the outer side of said block-wing. A gravity-detent $q$, in pivotal connection with the block-wing, operates in conjunction with the stem-head, and a lug $r$ on the standard-top constitutes a trip for the detent, this construction and arrangement of parts being clearly illustrated in Figs. 2, 5, and 7.

Loose in block G, transversely of the same, is a pin N, the point of which registers with the split in band M and is pushed into the latter against resistance of a surrounding spiral spring $s$ by means of a spring-controlled angular lever O, in pivotal connection with the standard-top, this lever being provided with a nose $t$, that comes in the path of a finger $u$, depending from an automatic vertically-reciprocative plate P, carried by said block. A stop $w$ is arranged on the standard-top to limit retraction of the lever O after it has been acted upon by the plate-finger $u$, and the latter has its forward edge beveled, so that it may lift and ride over the lever-nose when the block G and hook H are on forward throw. The pin N, lever O, and plate P are clearly illustrated in Fig. 5, the plate-finger $u$ being best illustrated in Fig. 6. As a matter of detail the plate P is provided with longitudinal slots, in loose engagement with guide-screws $x$, run into correspondingly-tapped openings in the block G aforesaid.

Made fast to the standard-top by means of concealed bolts or screws $y$, as shown in Fig. 5, is a housing Q, having a slotted top and hinged cover Q', as best illustrated in Fig. 1. Supported in the housing, as shown in Fig. 2, is a chute R, that has its upper end in register with a coin-slot $z$ in the top of said housing, (this slot being illustrated in Fig. 1,) and the lower end of the chute registers with the split band M when the sliding hook-bolt H and parts in connection therewith are shot forward, so as to permit engagement of said bolt with a bicycle-wheel that may be positioned in the aforesaid yoke. A coin dropped through slot $z$ in the housing-top will descend the chute R, enter the split band M, and come to rest on the standard-top forward of a slot $b'$ in the same. Now if the hook-bolt be pushed toward the rear the plate P, in loose connection with the block G, will act upon nose $t$ of lever O, and the resulting movement of the latter on its pivot will push pin N into the split band M against the coin aforesaid, whereby said band and coin are forced over out of line with the slot $b'$ in the standard-top, whereupon the gravity-detent $q$ finds its way between the block-wing G' and head $n'$ of spring-controlled stem $n$, that appertains to the aforesaid split band or temporary coin-holder, whereby the latter and its contents are held for a time in the position to which they have been adjusted.

Succeeding the operation just explained, that portion of the coin projecting above its holder will operate as a cam to lift latch L and thus permit the bolt to continue on its rearward travel. Simultaneous with the completion of the rear travel of the bolt the coin drops through a slot $c'$ in the standard-top to find lodgment in the chamber above specified, the gravity-detent $q$ is lifted out of the path of stem-head $n'$ by contact with the trip-lug $r$, and the front edge of reciprocative plate P comes in rear of a spring-controlled latch S, having pivotal connection with said standard-top, this latch having been previously retracted by said plate. The bolt and parts connected therewith are now held full back until the latch S is retracted, and the mechanism necessary to the latter operation in the present apparatus will be now explained.

In pivotal connection with the frame K on the standard-top is a lever T, that extends up through a slot $d'$ in the housing-top. The upper portion of this lever is shown provided with wings T', that extend in opposite directions and have curved upper edges, these wings serving to fill up the play-space in the slot $d'$ aforesaid. A longitudinally-slotted cam-plate U engages lateral guides $e'$, in connection with the lever T, and has play parallel to the latter. When the lever is swung forward, the cam-plate U will automatically clear a projection $f'$ of latch S, but on reverse movement of said lever said cam-plate will operate against the projection of said latch, thus swinging the latter away from the plate P on block G, in case the bolt has been pushed back, as above described, this operation permitting the previously-contracted spring J to exert its power and thus shoot said bolt forward to the position best illustrated in Fig. 1.

A post $g'$ on the standard-top supports a notched plate W, having a transverse slot engaging a pivot-screw $h'$, set in said post, and a spring $i'$, made fast on one end to the plate, has its other end impinged against a washer $j'$ under the head of the pivot-screw. Hence said plate is capable of lateral play on its pivot for the purpose hereinafter specified. The lever T operates in opposite directions against projections of the plate W, as will be apparent by reference to Fig. 5, and this plate has shackle connection with a rod X, that has longitudinal play in standards of the frame K, as clearly illustrated in Fig. 7.

Vertical arms Y, in rigid connection with the rod X, have spanner ends engaging annular grooves in the hubs of rotary tumblers Z, that have their bearings on hubs of index-disks Z', the latter being rotative on an arbor Z'' in frame K and partially exposed through slots in the housing-top. The indices on the peripheries of the disks Z' are preferably letters of the alphabet, as shown.

A lateral stud $k'$ on each of the index-disks is for the engagement of any one of a series of perforations arranged in a circle around the adjacent tumbler, and each of the latter is provided with a series of radial notches, as is best shown in Fig. 4, these perforations and notches being in corresponding relation to the characters on the index-disks. When the plate W is operated in one direction, an engagement of the tumbler-perforations and studs $k'$ of the index-disks will take place as soon as registration of said perforations and studs is effected, and owing to this clutch action each disk and its companion tumbler may have rotation together. The provision for yielding spring-resisted play of plate W on its pivot prevents accident to the connection between it and rod X, when the lever T is operated, in case a tumbler-perforation is not at that time in registration with the stud on the companion index-disk; but as soon as the registration is effected by manipulation of the tumbler reaction of the spring controlling said plate will operate to effect full throw of said rod and thus bring about the desired clutch connection of all the tumblers and their companion disks.

In pivotal connection with the stationary frame K is a lock-fence in the form of a gravity-frame having latch members B' for the engagement of notches $m'$ in the tumbler-hubs, and secondary latches C' are shown in pivotal connection with the latch-frame above its aforesaid members, these secondary latches being for engagement with the other tumbler-notches.

A stud $p'$, extending laterally from lever T, operates against a cam-wing $q'$ on the gravity latch-frame to lift the latter, and this latch-frame is also provided with a check-wing $r'$, that comes in the path of said stud under certain conditions to limit the rearward throw of said lever, the lift of the cam-wing taking place when the aforesaid lever has a forward throw.

The tumblers, index-disks, clutch mechanism, and fence laterally described constitute a permutation-lock that may be set on any one of an indefinite variety of combinations. Ordinarily all the latches B' C' are in locking engagement with tumblers, and the latter are out of clutch with the index-disks, the lever T being full back, as shown by full lines in Fig. 4, this being the primary or first position of said parts when the bolt H is shot forward. In the primary position of the parts just explained the lever T is limited as to forward movement by the lateral plate-guide $e'$ therewith being opposed by a stop $t'$ on the block G, rigid with the shank of the bolt, as best shown in Fig. 5, it requiring full retraction of said bolt and block in order to effect a clearance that will permit full forward throw of said lever. The bolt having been pushed back and secured, as above specified, the index-disks may be rotated to form any desired combination of characters registrable with pointers $u'$ on the housing-top. This having been done the lever T is pulled forward to the second position indicated by dotted lines in Fig. 4, thus causing lift of the gravity-frame, whereby the latches B' C' are disconnected from the tumblers, and at the same time these tumblers are clutched with the index-disks. On the completion of the latter operation partial rotation of any one or all of the index-disks will break the predetermined combination and at the same time bring the tumbler notch or notches for a latch or latches B' out of register with the latter. At the same time the check-ring $r'$ of the gravity-frame is brought in the rearward path of stud $p'$ to prevent further backward movement of lever T than the third position shown by dotted lines in Fig. 4. Therefore it is obvious that there must be a full drop of said gravity-frame before there can be corresponding reversal of said lever. The lever T being full forward any one of the index-disks and its companion tumbler in clutch therewith can be rotated indefinitely, because of the full elevation of the gravity-frame, and in case said lever be moved back to the third position, above explained, said gravity-frame will drop far enough to permit of the secondary latches C' catching in radial slots of any tumblers that may be started on rotation. Hence it is obvious that mischievous or evil-disposed persons cannot determine the proper combination by manipulatian of said index-disk and lever exposed through the housing-top. When the proper combination is formed by manipulation of the index-disks, there is a full drop of the gravity frame or fence to lock the tumblers and free the lever T, reversal of the latter causing the cam-plate U to trip latch S and thus permit forward shoot of the bolt for the purpose of freeing a previously-locked bicycle.

While I have shown one form of rotary tumblers, the detail of the latter and the fence portion of the permutation-lock may be varied so long as provision is had for locking these tumblers against rotation simultaneous with an action of the exposed hand-lever to shoot the bolt forward when a predetermined combination of characters on the index-disks are alined to thus permit full reverse throw of said lever.

Having thus described my invention, what I claim as new, and desire to secure by Letters Patent, is—

1. A stand having a bicycle-securing bolt, a check-latch opposing the shoot of the bolt to working position, a holder normally arranged in conjunction with the bolt to receive a latch-tripping coin deposited in the stand, another latch operative automatically to catch the bolt in working position, a permutation-lock capable of being set to a choice of combinations from outside the stand subsequently to the latching of the bolt in working position, a lever coöperative with the fence of the lock and accessible outside the stand, suitable means for preventing a full throw of the lever in either direction, except the bolt be caught in working position and the lock-fence full down, and a tripper for the latter of the aforesaid latches operative in conjunction with the lever.

2. A stand having a spring-controlled bicycle-securing bolt, a check-latch opposing shoot of the bolt to working position against resistance of its controlling-spring, a holder normally arranged in conjunction with the bolt to receive a latch-tripping coin deposited in the stand, another latch operative automatically to catch the bolt in working position, a permutation-lock capable of being set to a choice of combinations from outside the stand subsequently to the latching of the bolt in working position, a lever coöperative with the fence of the lock and accessible outside the stand, suitable means for preventing full throw of the lever in either direction, except the bolt be caught in working position and the lock-fence full down, and a tripper for the latter of the aforesaid latches operative in conjunction with the lever.

3. A stand having a bicycle-securing bolt, a check-latch opposing shoot of the bolt to working position, a laterally-reciprocative split band having travel with the bolt and normally arranged to partly register with a slot communicating with a chamber portion of the stand provided with a lock-secured closure, a spring-controlled push-pin arranged to register with the split of the band, a spring-controlled lever operative incidental to the bolt movement to project the pin into said band against a latch-tripping coin temporarily caught therein, whereby the aforesaid band and its contents are moved out of the way of the aforesaid slot to subsequently come into register with another slot communicating with the chamber portion of the stand, another latch operative automatically to catch the bolt in working position, a permutation-lock capable of being set to a choice of combinations outside the stand subsequent to latching of the bolt in working position, a lever coöperative with the fence of the lock and accessible outside the stand, suitable means for preventing full throw of the lever in either direction, except the bolt be caught in working position and the lock-fence full down, and a tripper for the latter of the aforesaid latches operative in conjunction with the lever.

4. A stand having a yoke extended therefrom for the engagement of a bicycle-wheel, an arm on the yoke side of the stand, a bolt having a hook extremity that may be brought into proximity with said arm, a check-latch opposing shoot of the bolt to working position, a holder normally arranged in conjunction with the bolt to receive a latch-tripping coin deposited in the stand, another latch operative automatically to catch the bolt in working position, a permutation-lock capable of being set to a choice of combinations from outside the stand subsequently to the latching of the bolt in working position, a lever coöperative with the fence of the lock and accessible outside the stand, suitable means for preventing the full throw of the lever in either direction except the bolt be caught in working position and the lock-fence full down, and a tripper for the latter of the aforesaid latches operative in conjunction with the lever.

5. A stand having a bicycle-securing bolt, a block in rigid connection with the bolt-shank to move therewith and provided with a lug, a gravity-latch in the path of the lug having a lift to clear the same incidental to the movement of a coin caught for a time with the block, a projection on the block, a spring-controlled latch having yield to the block projection when the bolt is shot to working position but which reacts to operate as a temporary stop against said bolt projection, a permutation-lock capable of being set to a choice of combinations outside the stand, a lever coöperative with the fence of the lock and accessible outside the stand, suitable means for preventing the full throw of the lever in either direction, except the bolt be caught in working position and the lock-fence full down, and trip-plate for the spring-controlled latch reciprocative on the lever.

6. A stand having a bicycle-securing bolt, a block in rigid connection with the bolt-shank to move therewith and provided with a lug, a gravity-latch in the path of the lug, a split band positioned in a block-aperture of greater width than itself to normally register with a portion of a slot communicating with a chamber portion of the stand and constituting a temporary holder for a gravity-latch tripper in the form of a coin deposited in said stand, a spring-controlled shank extending laterally from the split band and provided with a head, a gravity-detent arranged to fall in the path of the stem-head incidental to the shift of said band, a spring-controlled push-pin operative through the band-slit against the opposing temporarily-caught latch-tripper coin, a spring-controlled lever operative against the push-pin, a plate having reciprocative play on the bolt-block and operative as a means for actuating the push-pin lever, a trip-lug for the gravity-detent, a spring-controlled latch having yield to the aforesaid reciprocative plate when the bolt is shot to working position but which reacts to operate as temporary stop against said plate, a trip mechanism for the latter latch, and suitable means for locking the trip mechanism against action.

7. A stand having a bicycle-securing bolt and coin-controlled means for automatically latching the same in working position, a latch-tripping mechanism comprising a lever accessible outside the stand, a permutation-lock comprising index-disks loose on a suitable supported arbor within the stand but accessible outside the latter and provided with lateral clutch-studs, radially-notched tumblers loose on hubs of the disks and having clutch-stud perforations corresponding to the indices on the disks; a sliding rod provided with arms engaging annular grooves in the tumbler-hubs, a spring-controlled pivot-plate that has shackle connection with the sliding rod and is actuated by the latch-tripping lever but is capable of sliding play on its pivot, a lateral stud on the lever, a cam-wing on the lock-fence in the path of the latter stud when said lever is on throw in one direction, and a check-wing on said lock-fence arranged to come in the reverse path of the lever-stud when the aforesaid lock-fence is lifted and automatically held against full descent in the aforesaid tumblers.

8. A hollow standard partitioned to form a chamber in the upper portion thereof and having its top provided with slots in communication with the chamber, a locking-closure for said chamber, a yoke and arm projecting from the outside of the standard, a frame on the standard-top, a housing inclosing the frame, a bicycle-securing bolt having a hook end operative in conjunction with said arm, a check-latch having a tilting connection with the frame and operative to oppose the inshoot of the bolt, a holder normally arranged in conjunction with the bolt to receive a latch-tripper in the form of a coin, a chute leading from a slot in the housing to said holder, another latch operative automatically to catch the bolt in working position, a permutation-lock supported by said frame and comprising index-disks extending through housing-slots, a lever coöperative with the fence of the lock and extending through another housing-slot, suitable means for preventing the full throw of the lever in either direction except the bolt be caught in working position and the lock-fence full down, and a tripper for the latter of the aforesaid latches operative in conjunction with the lever.

9. A hollow standard partitioned to form a chamber in the upper portion thereof and having its top provided with slots in communication with the chamber a locking-closure for the chamber, a yoke and arm projecting from the outside of the standard, a frame on the standard-top, a slotted housing inclosing the frame, a bicycle-securing bolt having a hook end operative in conjunction with said arm, a check-latch having tilt connection with the frame and operative to oppose the inshoot of the bolt, a holder normally arranged in conjunction with the bolt in partial register with a standard-slot to receive a latch-tripper in the form of a coin, a chute leading from a housing-slot to the holder, suitable means for automatically moving the holder and a coin therein out of the way of said standard-slot upon the inshoot of the bolt, said coin having a subsequent drop through another standard-slot, another latch operative to catch the bolt in working position, a permutation-lock supported by said frame and comprising index-disks extending through housing-slots, a lever coöperative with the fence of the lock and extending through another housing-slot, suitable means for preventing the full throw of the lever in either direction except the bolt be caught in working position and the lock-fence full down, and a tripper for the latter of the aforesaid latches operative in conjunction with the lever.

In testimony that I claim the foregoing I have hereunto set my hand, at Two Rivers, in the county of Manitowoc and State of Wisconsin, in the presence of two witnesses.

FRANK EGGERS.

Witnesses:
OSCAR C. STOCKMEYER,
WM. R. KOHLENBERG.